UNITED STATES PATENT OFFICE.

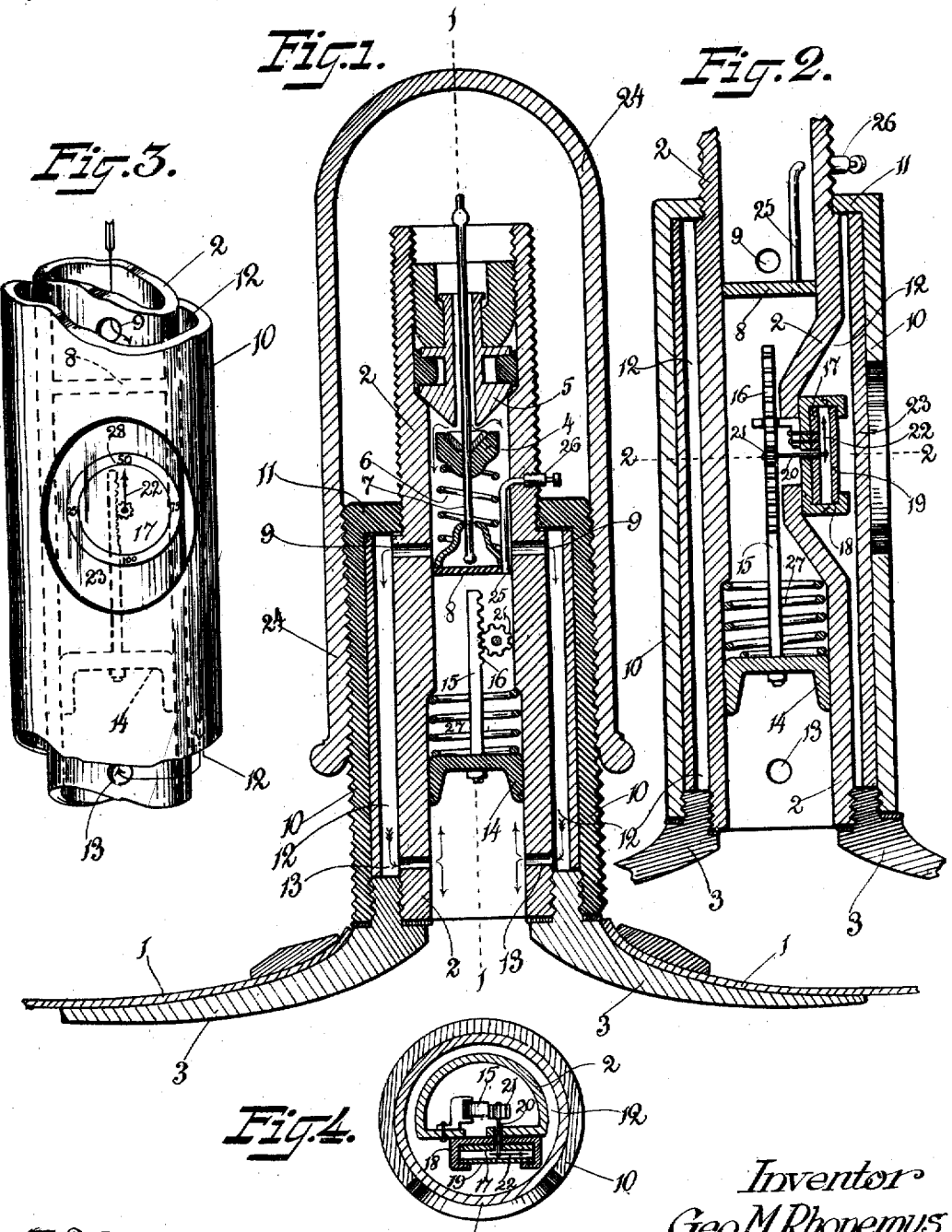

GEORGE M. RHONEMUS, OF INDEPENDENCE, MISSOURI.

PRESSURE-GAGE FOR PNEUMATIC TIRES.

1,283,305.

Specification of Letters Patent. Patented Oct. 29, 1918.

Application filed December 26, 1916. Serial No. 138,736.

*To all whom it may concern:*

Be it known that I, GEORGE M. RHONEMUS, a citizen of the United States, residing in the town of Independence, county of Jackson, and State of Missouri, have invented certain new and useful Improvements in Pressure-Gages for Pneumatic Tires, of which the following is a specification.

My invention relates to improvements in pressure indicating gages, and more especially to gages of this character which are adapted to indicate the air pressure of an automobile or similar tire.

The objects of my invention are to produce a comparatively simple, cheap, durable, and efficient device of this class, and to so locate and arrange it in a valve stem that the tire may be freely pumped up in the ordinary manner, and so that the gage will at all times automatically indicate the degree of air pressure contained in the inner tube, or tire proper.

To accomplish the foregoing and other objects, I arrange the pressure indicating gage in a valve stem in proximity to and slightly above the inner tube to which the valve stem is attached and locate the tire valve proper over and exterior to the pressure indicating gage, passages being provided around the gage leading from the valve to within the interior of the inner tube for conducting the compressed air as it is pumped into the said inner tube.

An embodiment or adaptation of my improvement is hereinafter set forth in the following description, and particularly pointed out in the appended claim, reference being had to the accompanying drawings, in which several views of a valve equipped with my improved pressure indicating gage are shown.

In the drawings:

Figure 1 represents a central longitudinal section through a valve stem, equipped with my improved pressure indicating gage, also showing a fragmentary view of an inner tube to which the stem is attached.

Fig. 2 is an enlarged fragmentary central longitudinal section through the valve stem taken at approximately a right angle to Fig. 1, and on line 1—1 in said Fig. 1.

Fig. 3 is a side elevation of a fragment of the valve stem illustrating the indicating dial, the indicating hand, and the view window placed in front of the same.

Fig. 4 is a transverse section through the valve stem taken on line 2—2, Fig. 2.

In the preferred form of my invention here illustrated the gage is shown located within the inner metallic tube or stem, which constitutes the valve stem proper, and just above the point of attachment of said stem to the inner tube of the tire. The usual air inflating valve for the tire is arranged exterior to and in the outer portion of the stem above the gage and separate therefrom.

In referring to the illustrations of my invention shown in the accompanying drawings in detail, like numerals indicate corresponding parts.

My improved pressure indicating gage is primarily designed to be utilized in conjunction with the usual inflating valve of a pneumatic tire, the valve stem of said valve being arranged to contain the pressure gage in position next to the tire, and with the inflating valve located over the same.

In Fig. 1, I have shown a fragment, 1, of the inner tube of a pneumatic tire of the usual and well known type. A valve stem, 2, is attached to said tube in the usual and well known way, substantially as shown in Fig. 1 being provided at its lower or inner end with a surrounding flap, 3, of rubber, which fits through the opening in the tube and is cemented to the interior of the same. The metallic valve stem, 2, has its upper portion exteriorly screw threaded and its interior shaped to receive the usual inflating valve, 4, which normally closes against a conical valve seat, 5, being pressed in tight position by the spring, 6.

The valve, 4, is mounted upon a valve rod or stem, 7, of the usual type. A transverse partition, 8, is fitted in a medial portion of the interior of the stem, 2, and provides an air tight barrier.

Through the wall of the valve tube or stem, 2, slightly above this partition, I provide one or more openings, 9, which constitute air passages and around the lower portion of the stem, 2, I preferably fit an outer casing, 10, which is constructed of suitable metal and is provided with an inwardly extending annular top flange, 11, as shown in Fig. 1. The casing, 10, is made sufficiently larger than the valve stem to provide an intervening annular compartment or chamber, 12, into which the air flows from the passages, 9, as indicated by arrows in Fig. 1.

Near the lower end of the valve stem, I also provide one or more openings, 13, which form passages through which the air flows from the annular chamber, 12, as indicated by the lower arrows. My improved air pressure indicating mechanism is preferably located in the lower portion of the valve stem below the inflating valve, and below the air tight barrier, 8.

Preferably, this mechanism is constructed in a simple, durable, and practically fool proof form, comprising a piston, 14, slidably mounted in the lower portion of the valve stem, and having an upwardly extending rod, 15, which carries a rack, 16. The indicating dial, 17, is set in a circular box, 18, the valve stem, 2, being recessed or flattened on one side to receive said box, as shown in Fig. 2, and said box, 18, is provided with a window of glass or similar transparent material, 19, through which the dial can be viewed. A short horizontal shaft, 20, is rotatably mounted in the center of the dial containing box, 18, and carries a pinion, 21, at its rear end, which meshes with the rack bar, 16.

The indicating hand, 22, is located at the front extremity of the shaft, 20, and is adapted to be turned to indicate the degree of compression upon the dial through the rotation of the shaft by means of the rack and pinion. The outer casing, 10, is also provided with a view window, 23, through which the position of the indicating hand may be easily noted when the outer inclosing cap, 24, is removed.

The piston 14 is supposed to make an air tight fit with the interior of the stem 2, but this is sometimes only theoretically possible. After a considerable period of use a certain amount of air will seep past the piston and enter the chamber formed thereby and the partition 8. The air which had entered said chamber, from the inner tube 1, would carry a pressure considerably above atmospheric, and, consequently, would exert a downward pressure upon the top of the piston 14. This pressure would naturally tend to move the rack 15 downwardly, and would render inaccurate the readings on the dial 19. To obviate this difficulty I have provided a relief opening into the said chamber. This comprises a tube 25 extending through the partition 8 into the chamber, and out through the stem 2, above the flange 11. A relief valve 26 is positioned on said tube outside of the stem. In use when the operator wishes to ascertain the degree of air pressure in the pneumatic tube 1, he opens the relief valve 26, and any compressed air rushes out through the tube 25. Atmospheric pressure being thereby restored in the chamber below the partition 8, pressure in the tube 1 will cause the dial to register properly.

A spring 27, interposed between the piston 14 and a downwardly facing annular shoulder in the stem 2, above the piston, tends to preserve the piston 14 in a position proportionate to the pressure in the pneumatic tube 1, but an absolutely accurate reading may be secured by manipulation of the valve 26.

The operation of my automatic pressure indicating gage is as follows:

The air being pumped through the inflating valve in the usual manner, it passes out through the openings, 9, into the chamber 12, around the pressure indicating gage, and then inwardly through the openings, 13, into the interior of the valve stem, and finally into the interior of the tire. The course that the air follows in passing into the interior of the tire is indicated by arrows in Fig. 1. When the pressure of air within the tire is increased by inflation, the extra pressure forces the piston upward against the tension of the spring, 27, turning the shaft, 20, by means of the rack and pinion and moving the indicating hand to indicate the proper tire pressure upon the dial. The dial itself, it will be noted, as shown in Fig. 3, is provided with a series of pressure indicating numerals, 28.

While I have described in the foregoing specification adaptations or embodiments of my invention, it should be understood that the structural parts thereof may be varied, changed, modified, or altered or one or more may be omitted or dispensed with without departing from the spirit of my invention as fairly defined in the following claim, or as may be imparted thereto by invoking the doctrine of equivalents.

What I claim as my invention and desire to secure by Letters Patent is:—

A device of the character described comprising a hollow stem adapted for attachment to a pneumatic tire and having an inflating valve, a closed substantially air tight chamber in the interior of said stem, a pressure indicating mechanism on the outside of said stem, means in said chamber whereby said mechanism is actuated by fluctuations in pressure in the tire, a relief port leading into said chamber, and a valve controlling said port, substantially as described.

GEORGE M. RHONEMUS.

Witnesses:
D. M. McINTYRE,
A. MORGAN.